(12) United States Patent
Ding et al.

(10) Patent No.: US 12,554,710 B2
(45) Date of Patent: Feb. 17, 2026

(54) ADAPTIVE DISK SPILL BASED ON MEMORY USAGE OF SHARED STORAGE

(71) Applicants: Lemon Inc., Grand Cayman (KY); Beijing Zitiao Network Technology Co., Ltd., Beijing (CN)

(72) Inventors: Wei Ding, Los Angeles, CA (US); Li Zhang, Los Angeles, CA (US); Yuanjin Lin, Beijing (CN); Kui Wei, Los Angeles, CA (US); Yuxiang Chen, Los Angeles, CA (US); Jianjun Chen, Los Angeles, CA (US)

( * ) Notice: Subject to any disclaimer, the term of this patent is extended or adjusted under 35 U.S.C. 154(b) by 0 days.

(21) Appl. No.: 18/798,502

(22) Filed: Aug. 8, 2024

(65) Prior Publication Data

US 2024/0403292 A1   Dec. 5, 2024

(51) Int. Cl.
G06F 16/2453 (2019.01)
G06F 11/30 (2006.01)
G06F 11/34 (2006.01)

(52) U.S. Cl.
CPC ...... G06F 16/2453 (2019.01); G06F 11/3037 (2013.01); G06F 11/3447 (2013.01)

(58) Field of Classification Search
CPC ............. G06F 11/3037; G06F 11/3447; G06F 16/2453
See application file for complete search history.

(56) References Cited

U.S. PATENT DOCUMENTS

| | | | |
|---|---|---|---|
| 11,789,936 B2 | 10/2023 | Chen et al. | |
| 2016/0328273 A1* | 11/2016 | Molka | A61B 8/00 |
| 2017/0169097 A1* | 6/2017 | Petri | G06F 16/23 |
| 2020/0379998 A1* | 12/2020 | Dixit | G06F 16/24532 |
| 2021/0191942 A1* | 6/2021 | Arnold | G06F 16/24553 |
| 2023/0066540 A1* | 3/2023 | Chen | G06F 16/278 |

OTHER PUBLICATIONS

Chen, J. et al., "ByteHTAP: ByteDance's HTAP system with high data freshness and strong data consistency," Proceedings of the VLDB Endowment, vol. 15, No. 12, Aug. 1, 2022, 14 pages.

* cited by examiner

Primary Examiner — Tarek Chbouki
(74) Attorney, Agent, or Firm — Alleman Hall LLP

(57) ABSTRACT

A hybrid transactional/analytical processing database includes an OLTP engine, OLAP engine, and shared storage including a mass storage device holding data of multiple tenants. The shared storage includes processing circuitry configured to implement a query executor configured to continuously monitor actual memory usage of the shared storage while the shared storage is responding to one or more queries from the OLTP engine or OLAP engine. Upon determining the actual memory usage of an operator evaluating the one or more of the queries from the OLTP engine or OLAP engine at the shared storage exceeds the preventative memory usage threshold but does not exceed the system memory usage threshold, the query executor is further configured to spill one or more fragments of query memory corresponding to the one or more queries to the mass storage device, without terminating the one or more queries.

12 Claims, 6 Drawing Sheets

ADAPTIVE DISK SPILL BASED ON MEMORY USAGE OF SHARED STORAGE

BACKGROUND

Databases are designed with various types of architecture. Online transaction processing (OLTP) architecture is oriented toward processing transactions. Like with a bank account, transactions tend to be simple and numerous, and may include queries such as read, insert, update, delete, etc. However, OLTP architecture lacks massively parallel processing (MPP) capability. In contrast, online analytical processing (OLAP) architecture is oriented toward processing data analysis. Queries handled by OLAP architecture tend to be more complex, involve more data, and take more time to complete. For example, OLAP architecture may be responsible for determining an average sale price over the past year of a particular product tracked by the database. Many database users have used both types of processing using the same data, and thus a hybrid transactional/analytical processing (HTAP) database has been developed which includes both types of architecture in a single database.

Disk spill refers to the process of writing the contents of memory (e.g., random access memory (RAM)) used by a query to mass storage (e.g., a hard disk). Typically, disk spill is programmed to occur when memory runs out, i.e., when available memory drops below a predetermined threshold or conversely when memory usage exceeds a predetermined threshold. When a query spills to disk, processing times can greatly increase, since the data has to be moved to disk and since access times (latency) for the data in mass storage are longer than in memory. One way to avoid disk spill is to not use disk spill at all-however this would result in termination of queries that exceed memory requirements and returning no result, which would require the client to re-send the request, greatly degrading performance of the overall database system. Another way to potentially avoid disk spill is to provide larger memory. However, providing larger memory for such edge cases where disk spill occurs could be cost prohibitive.

Thus, many database systems, including HTAP database systems, establish a mechanism for disk spill, and use it as an optimization technique, to enhance overall performance of the database system. Even though some queries will take longer to process when spilled to disk, they will be performed faster than if terminated entirely, and costs for memory can be controlled. Further, by spilling intermediate data to disk when memory limits are exceeded, databases can handle queries of varying complexity. This approach allows databases not only to handle simple transactional queries, but also to handle complex analytical queries over larger datasets efficiently, thereby enhancing overall system performance.

Many disk spill implementations rely on preset memory thresholds at the query or operator level for spillable operators. However, there are drawbacks to using such preset memory thresholds in real-world scenarios. First, workload understanding and accurate threshold setting can be technically challenging for database users, especially when workloads are dynamic and memory consumption unpredictable. Thus, in real-world scenarios the preset thresholds often result in sub-optimal performance. Second, complex queries hinder precise cardinality estimation by the optimizer. If the cardinality estimate is inaccurate, then disk spill may occur unexpectedly, such as when execution of a query is actually more complex than estimated by the optimizer. Third, in resource-constrained environments with concurrent queries, operators may need to spill data well before reaching the threshold for system stability. In such scenarios, the preset thresholds may turn out to be inadequate.

SUMMARY

To address these issues, a hybrid transactional/analytical processing (HTAP) database is provided herein that includes an online transaction processing (OLTP) engine, an online analytical processing (OLAP) engine provided separately from the OLTP engine, and a shared storage including a mass storage device holding data of multiple tenants. The shared storage may include processing circuitry and associated memory storing instructions that when executed cause the processing circuitry to implement a query executor configured to provision a preventative memory usage threshold and a system memory usage threshold for the shared storage, the preventative memory usage threshold being lower than the system memory usage threshold. The query executor may be further configured to continuously monitor actual memory usage of the shared storage while the shared storage is responding to one or more queries from the OLTP engine or OLAP engine. Upon determining the actual memory usage of an operator evaluating the one or more of the queries from the OLTP engine or OLAP engine at the shared storage exceeds the preventative memory usage threshold but does not exceed the system memory usage threshold, the query executor may be further configured to spill one or more fragments of query memory corresponding to the one or more queries to the mass storage device, without terminating the one or more queries.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

To address the aforementioned challenges, an adaptive disk spill approach is disclosed herein that utilizes both a query optimizer and a query executor to proactively plan disk spills, in order to avoid, to the extent possible, operating system imposed disk spill, and to, in some cases, progressively spill fragments of query memory to disk to avoid unnecessarily large disk spills. This approach mitigates inflexible preset memory threshold-based spills and minimizes the overall impact on query performance due to spilling, all while maintaining system stability.

Figure 1:
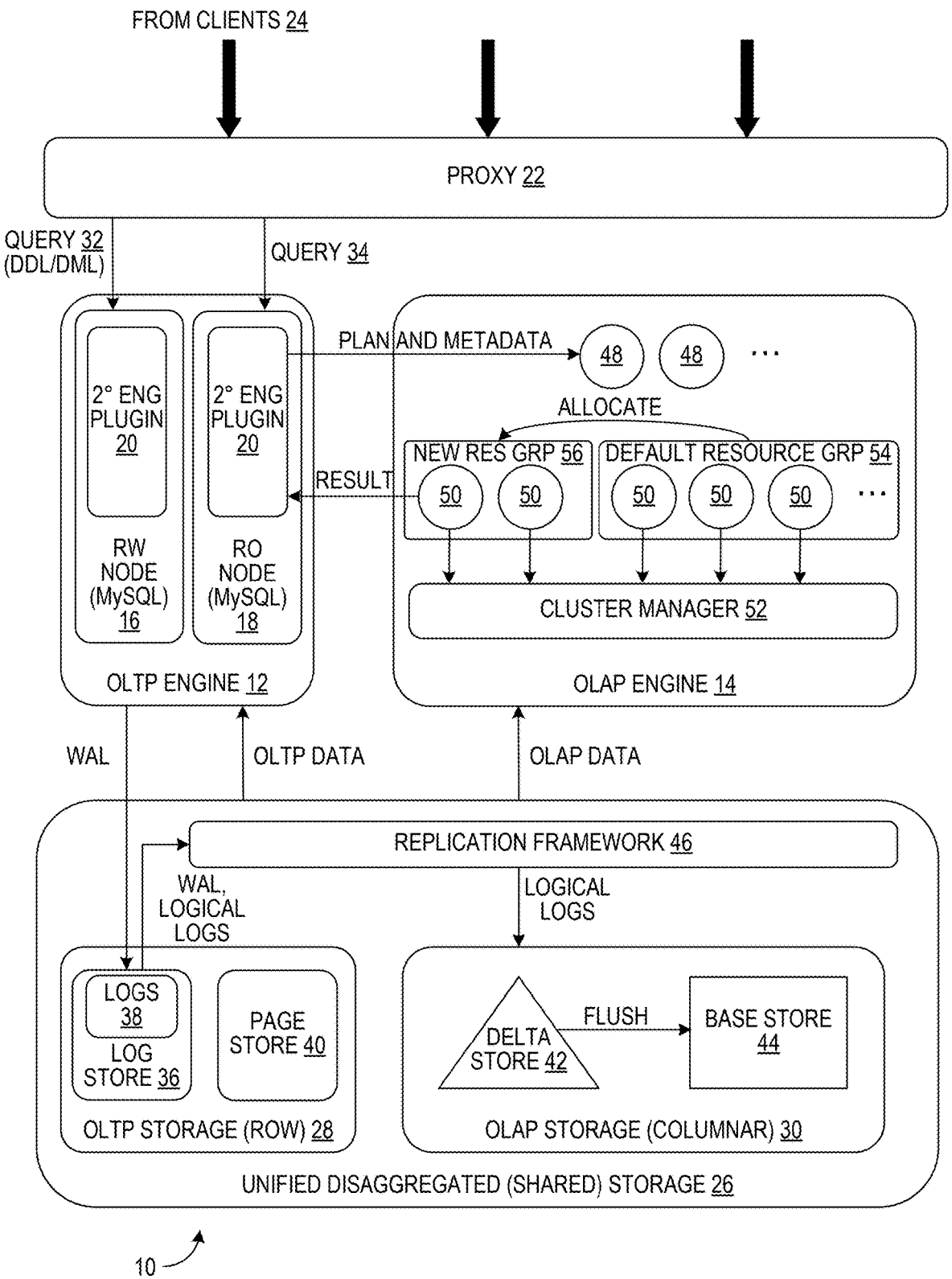
FIG. 1 illustrates a hybrid transactional/analytical processing (HTAP) database according to one example of the present disclosure.

FIG. 1 illustrates a hybrid transactional/analytical processing (HTAP) database 10 according to one example of the present disclosure. The HTAP database 10 may be hybridized in the sense that it includes both an online transaction processing (OLTP) engine 12 and an online analytical processing (OLAP) engine 14, which may be provided separately from the OLTP engine 12. That is, the HTAP database 10 may include separated compute engines. Keeping the two engines 12, 14 separate may allow each separate engine 12, 14 to exhibit peak performance for their respective workloads for which they are specialized while avoiding interference therebetween. Examples of HTAP databases with unified engines include SAP HANA and MEMSQL, and examples with separate engines include WILDFIRE and TIDB.

The OLTP engine 12 may include a read-write (RW) node 16 and a read-only (RO) node 18. Each node 16, 18 may include a respective secondary engine plugin 20, which is an extension that allows a proxy 22 to send all queries from clients 24 to the OLTP engine 12 and allow the OLTP engine 12 to determine which engine 12, 14 to use for a given query based on a variety of parameters such as query complexity. For example, data manipulation language (DML) queries and data definition language (DDL) queries may be sent only to the RW node 16, while other types of queries can be handled by either node 16, 18. By directing queries in this manner rather than at the proxy 22, the database 10 can support a read committed isolation level across both engines 12, 14, thereby guaranteeing the same results from either. For decreased latency, users may be given the option of sending queries directly to the OLAP engine 14 when the final destination is known from the start.

In contrast to the separate engines 12, 14, the HTAP database 10 may include a shared storage 26 holding data of multiple tenants. The shared storage 26 may be shared in the sense that it includes both an OLTP storage 28 holding data in row format for responding to queries of the OLTP engine 12, and an OLAP storage 30 holding data in column format for responding to queries of the OLAP engine 14. Typically, systems with separate compute engines also include separate storage, which commonly has low data freshness for OLAP queries.

The HTAP database 10 may be configured to support one unified application programming interface (API) and automatically route queries from the clients 24 to the OLTP engine 12 and OLAP engine 14 using the proxy 22. On a basic level, DML queries, DDL queries, simple queries, and queries otherwise suitable for OLTP (e.g., with predicates over indexes on OLTP tables) are included in queries 32 that are routed to the OLTP engine 12, while complex queries, such as those with multiple joins and aggregations, are included in queries 34 that are routed to the OLAP engine 14. In this manner, interference between OLTP and OLAP workloads is avoided while queries are performed by the appropriate engine 12, 14.

The OLTP storage 28 may include a log store 36 configured to persist logs 38 and a page store 40 configured to store versions of data pages and apply the logs 38 to construct current versions of the data pages. The logs 38 may include various types of logs, such as redo logs, logical logs, and write-ahead logs (WAL). The page store 40 may use redo logs to construct the data pages, while logical logs such as MYSQL binary logs for committed DML transactions may be passed on to the OLAP storage 30. The OLAP storage 30 may include a delta store 42 configured to record changes made to the OLTP storage 28, and a base store 44 configured to implement updates from the delta store 42 in persistent storage. Although the OLAP storage 30 as a whole may be columnar, it will be appreciated that the delta store 42 may store changes in row format until the changes are implemented to the base store 44 in column format. The delta store 42 may be in-memory while the base store 44 may be on-disk.

In order to ensure data freshness of the base store 44 for OLAP queries, the OLAP storage 30 may further include a replication framework 46 configured to perform log shipping of the logs 38 from the log store 36 to the delta store 42. In particular, the replication framework 46 may ship logical logs to the OLAP storage 30. The replication framework 46 may distribute the logs 38 to multiple storage nodes for each partition to build a columnar data store residing on different storage nodes from its corresponding row store.

The OLAP engine 14 may include a plurality of coordinators 48 for distributed plan generation and optimization, and a plurality of data servers 50 for distributed plan execution. A centralized cluster manager 52 may allow users to create resource groups out of the data servers 50, and may allocate data servers 50 from a default resource group 54 to a new resource group 56 as needed according to workload. For processing the query 34 at the OLAP engine 14, the secondary engine plugins 20 may generate a MYSQL-compatible query plan and perform simple optimizations before sending the partially optimized query plan, together with required metadata, to the coordinators 48 for distributed plan generation and optimization. After optimization, a co-located query scheduler may send fragment of the plan to a set of the data servers 50 for execution, which may read the data from the OLAP storage 30 and periodically send heartbeats to the cluster manager 52. The final result from the query may be buffered at one of the data servers 50 and fetched by the secondary engine plugins 20.

On a basic level, the OLTP engine 12, OLAP engine 14, and shared storage 26 may be made up of a plurality of servers working together to form a compute layer (e.g., the OLTP engine 12 and the OLAP engine 14) and a storage layer (e.g., the shared storage 26). In one example, the HTAP database 10 includes a plurality of clusters managed by the cluster manager 52, and each cluster includes six database servers, with four data servers 50 forming the OLAP engine 14 of that cluster and one RW node 16 and one RO node forming the OLTP engine 12 of that cluster. The shared storage 26 may include a plurality of storage servers, for example, three per cluster. It will be appreciated that this is merely one example and other suitable numbers of machines may be utilized.

Figure 2:
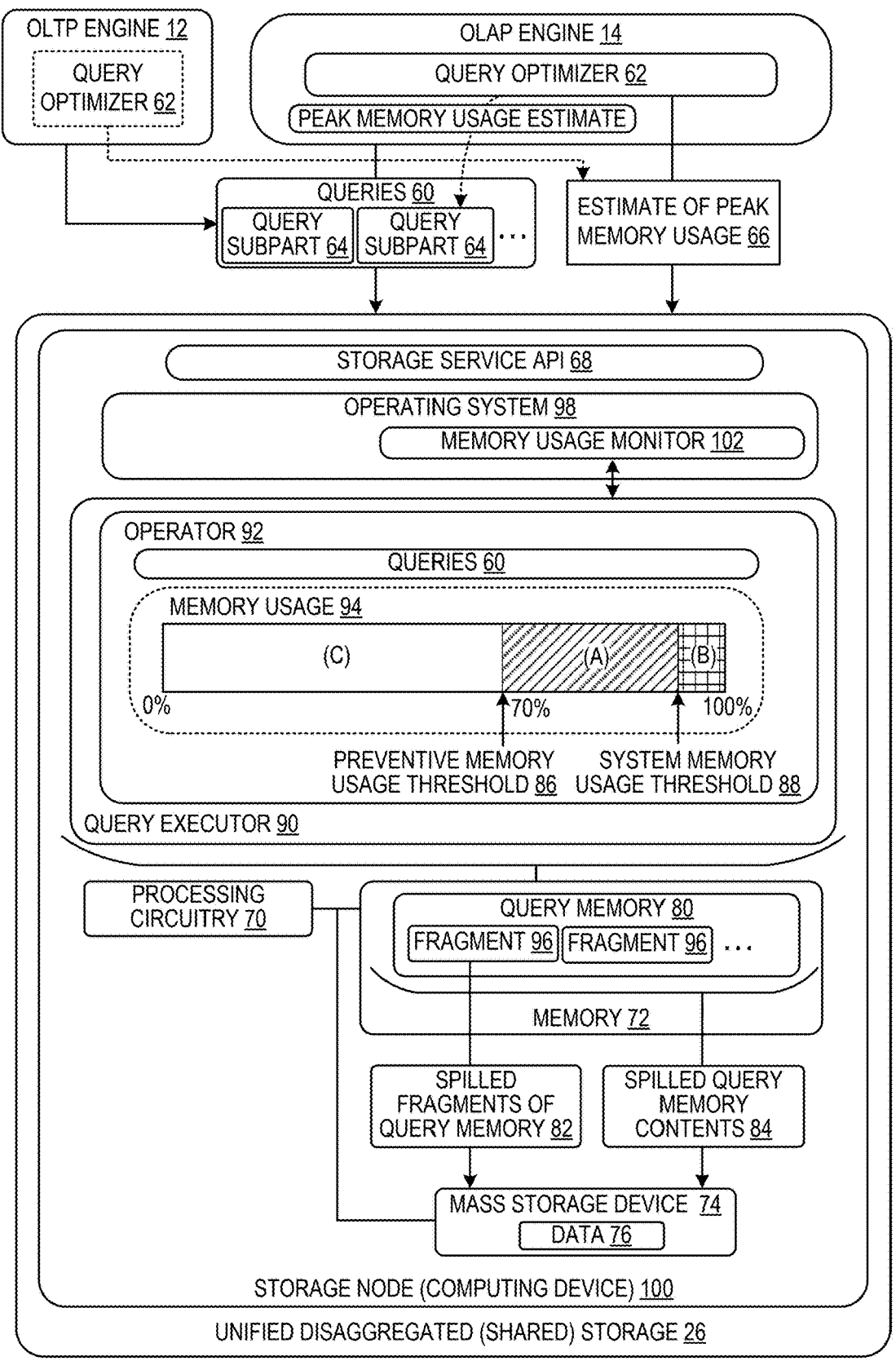
FIG. 2 illustrates a disk spill operation of a shared storage of the HTAP database of FIG. 1.

FIG. 2 shows a disk spill operation of the shared storage 26 of the HTAP database 10 of FIG. 1 during query execution. The shared storage 26 consists of a storage node 100 that includes processing circuitry 70, associated memory 72, and mass storage device 74. Storage node 100 is a computing device configured to store data in the mass storage device 74 of the computing device. Storage node 100 may be configured to operate in a virtualized computing environment. To this end, the storage node 100 may execute a plurality of virtual machines contemporaneously, each virtual machine being configured as a virtual storage node and being assigned a respective tenant. In this way, the mass storage device 74 can store data 76 of multiple tenants. It will be appreciated that in such a scenario, workloads of other tenants on the same physical storage node 100 can affect the ability of the physical storage node to handle workloads of a co-hosted tenants. The shared storage 26 further includes an operating system 98 and a storage service API 68 that brokers storage requests from requesting clients such as the OLTP engine 12 and OLAP engine 14. In a fully virtualized environment, a hypervisor may also be provided. The shared storage 26 further includes a query executor 90 that turns an optimized query plan generated by a query optimizer into actual data retrieval and manipulation operations.

During operation, the shared storage 26 receives one or more queries 60, each of which includes query subparts 64 from either the OLAP engine 14 or the OLTP engine 12. These queries 60 are stored in a query memory 80 within the memory 72. The query executor 90 of the shared storage 26 processes the stored queries 60, executing data retrieval and manipulation operations based on the query subparts 64 received from the OLAP engine 14 (or the OLTP engine 12), using the query memory 80 within the memory 72. While the OLAP engine 14 typically generates the queries 60 that are the subject of the present disclosure (since those OLAP queries are of an analytical nature and more often result in disk spill scenarios), it is also possible for the OLTP engine 12 to generate and send queries 60 to the shared storage 26 that may result in the disk spill scenarios discussed herein. Thus, queries 60 can originate from either engine.

During query execution, disk spill decisions may be made at the shared storage 26 in the following manner. The associated memory 72 stores instructions that when executed cause the processing circuitry 70 to implement the query executor 90 configured to provision a preventative memory usage threshold 86 (i.e., soft limit) and determine a system memory usage threshold 88 (i.e., hard limit) for the shared storage 26 in memory usage 94. The system memory usage threshold 86 may be set by the operating system 98 of the computing device and read by the query executor in one example, or may be programmably set by the query executor 90 in another example. As depicted in FIG. 2, for instance, the memory usage 94 ranges from 0% (lowest utilization) to 100% (highest utilization). The preventative memory usage threshold 86 is set between 1% and 99%, typically at a level between 60% and 90% memory utilization, and in the illustrated example is set at 70%. The preventative memory usage threshold 86 (e.g., 70%) is lower than the system memory usage threshold 88 (e.g., 95%). Intense memory usage (e.g., 90-100%) often occurs due to many or long queries running simultaneously, especially when they involve computationally heavy tasks like applying runtime filters to columns that lack indexes, and can occur when queries from multiple tenants are running in different virtualized environments on the same physical computing node. The query executor 90 is further configured to continuously monitor actual memory usage 94 of an operator 92 of the shared storage 26 via a memory usage monitor 102 of the operating system 98, while the shared storage 26 is responding to one or more queries 60 from the OLTP engine 12 or OLAP engine 14. Upon determining the actual memory usage 94 of the operator 92 evaluating the one or more of the queries 60 from the OLTP engine 12 or OLAP engine 14 at the shared storage 26 exceeds the preventative memory usage threshold 86 but does not exceed the system memory usage threshold 88, spill one or more fragments of query memory 82 corresponding to the one or more queries 60 to the mass storage device 74, without terminating the one or more queries 60. More specifically, the one or more fragments includes a plurality of fragments 96 within the query memory 80, where each of the plurality of fragments 96 has an associated estimated fragment memory usage 94. When the preventative memory usage threshold 86 is exceeded, the query executor 90 is configured to progressively spill the plurality of fragments 96 based on a determination of a minimum proper subset of fragments that can be spilled to lower the estimated fragment memory usage to below the preventative memory usage threshold 86, utilizing the estimated fragment memory usage for each fragment 96. Thus, instead of spilling all active fragments when the preventative memory usage threshold 86 is reached, a gradual approach can be adopted with progressive disk spill, where a subset of fragments are selectively spilled, allowing the remaining ones to continue running without performance degradation caused by excessive spill. This progressive disk spill mechanism ensures system health by minimizing the impact of spill on performance and maintaining stability.

Subsequently for the one or more queries 60 or on a next query, the processing circuitry 70 of the shared storage 26 is configured to determine based on the continuous monitoring of the actual memory usage 94 that the actual memory usage 94 exceeds the system memory usage threshold 88, and terminate the one or more queries 60 or next query and spill query memory contents 84 of the query memory 80 to the mass storage device 74. This near immediate termination prevents the system from running out of memory. However, as discussed above, the preventative memory usage threshold 86 can be preset to allow progressive disk spillage before the current memory usage reaches the system memory threshold 88. As a result, reaching the hard limit and abruptly terminating queries can be largely avoided, leading to a better user experience.

Detailed operations of spilling the queries 60 based on the memory usage 94 at the shared storage 26, along with scenarios/ranges (A), (B), and (C) are discussed below. In scenario/range (A), when the memory usage 94 falls between the preventative memory usage threshold 86 and the system memory usage threshold 88, the query executor 90 spills query data in memory (either all at once or progressively by spilling one or more of the plurality of fragments 96) to the mass storage device 74. In scenario/range (B), where the memory usage 94 exceeds the system memory usage threshold 88, the processing circuitry 70 of the shared storage 26 terminates the queries 60 or next query and spills the query memory contents 84 of the query memory 80 to the mass storage device 74. Finally, in scenario/range (C), when the memory usage 94 falls below the preventative memory usage threshold 86, the query executor 90 processes the queries 60 without spilling them to the mass storage device 74.

Additionally, at query execution time, disk spill decisions may be made by the query optimizer 62 of the OLAP engine 14 or the OLTP 12 engine in the following manner. The OLAP engine 14 or the OLTP 12 engine includes a query optimizer 62 configured to estimate a peak memory usage of the shared storage 26 to execute a current query of the one or more queries 60, and transmit an estimate of the peak memory usage 66 to the query executor 90 of the shared storage 26 along with the current query. In one specific implementation, the estimate of the peak memory usage 66 may be a hash table memory size estimation for a hash join or aggregation operator. In this implementation, at runtime, the query executor 90 may be configured to determine, before hash table build for the current query begins, whether the hash table memory size estimation is greater than available system memory, and if so, to commence disk spill without performing the hash table build. Further, additionally or alternatively, the estimate of the peak memory usage 66 may include a degree of confidence, and the estimate of the peak memory usage 66 may be transmitted to the shared storage 26 only after determining that the degree of confidence exceeds a minimum confidence threshold. Conversely, if the optimizer 62 lacks confidence in the estimation, the executor employs a progressive disk spill mechanism to prevent the system from running out of memory.

Moreover, at query planning time, disk spill decisions may be also made by the query optimizer 62 of the OLAP engine 14 or the OLTP 12 engine in the following manner. The query optimizer 62, is configured to, before sending the query to the shared storage 26, determine if an estimate of the peak memory usage 66 is greater than the system memory usage threshold 88 for the processing circuitry 70 of the shared storage 26, and if so, preselect a set of query operators to be spilled at the shared storage 26. The set of query operators to be spilled can be preselected in descending order of estimated memory usage, such that the estimated peak memory usage for the query after the preselected set of operators are spilled to the mass storage device 74, is below the system memory usage threshold 88. Consequently, the query optimizer 62 can select a set of query operators to be spilled at the beginning of execution, eliminating the costly switch from the in-memory state to the spilling state and reducing overall memory usage as soon as possible.

Figure 3:
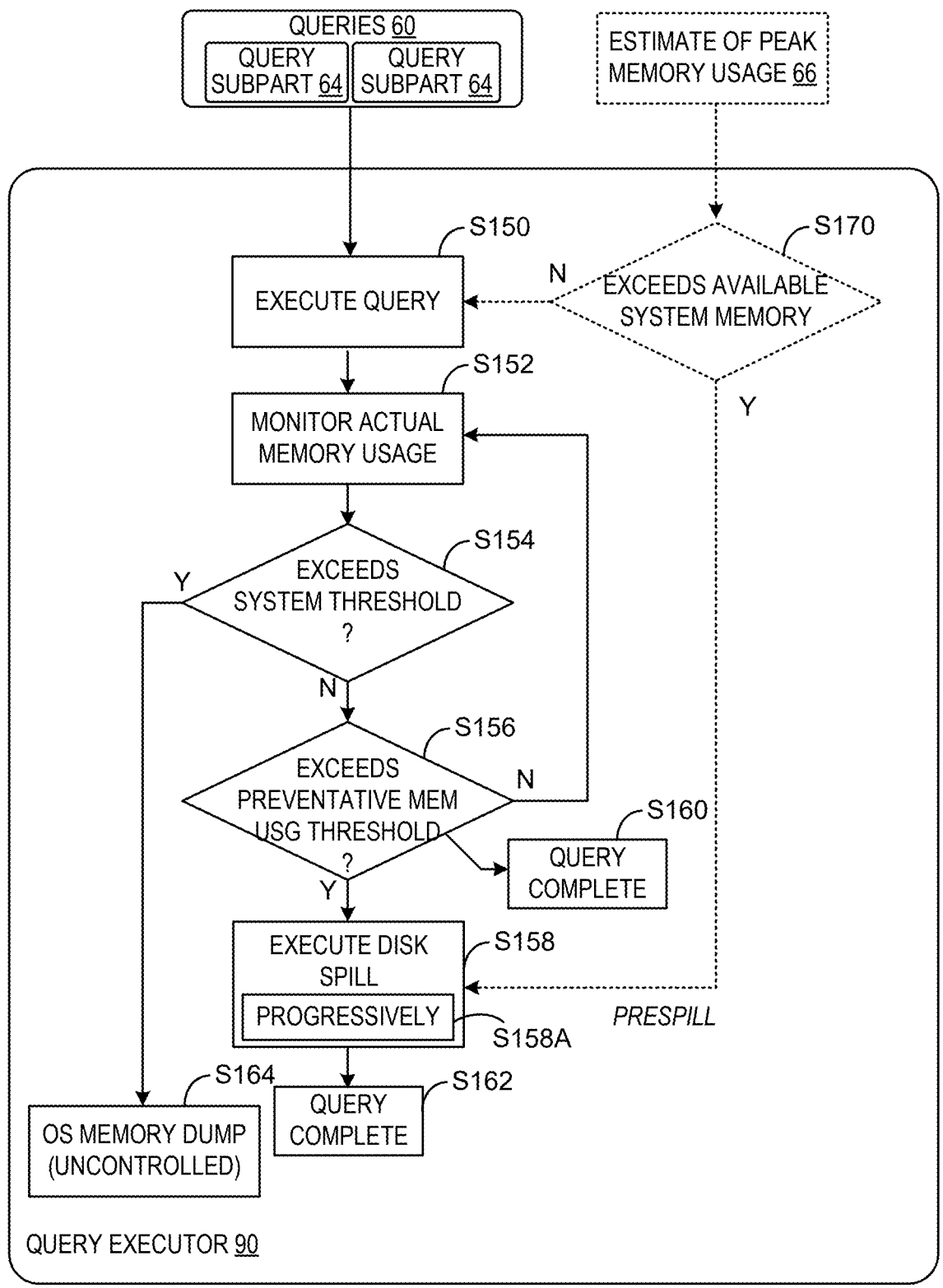
FIG. 3 shows an example internal logic of a query executor of the shared storage of FIG. 2 during query execution.

FIG. 3 shows an example internal logic of the query executor 90 of the shared storage 26 of FIG. 2 during query execution. First, the query executor 90 of the shared storage 26 executes queries (S150) and monitors actual memory usage (S152). When the memory usage exceeds the system memory usage threshold 88 (Y at S154), the processing circuitry 70 of the shared storage 26 dumps memory (S164) to disk in a disk spill operation that may be considered uncontrolled from the point of view of the query executor 90 since this memory dump may be controlled by the operating system 98 of the storage node. In other examples, this system threshold induced disk spill operation at 164 can be made under the control of the query executor 90.

When the memory usage does not exceed the system memory usage threshold 88 (N at 154) but exceeds the preventative memory usage threshold 86 (Y at 156), the query executor 90 executes disk spilling (S158), which may be executed progressively according to the techniques described herein (S158A), and processes the queries through completion at (S162) using the data that has been spilled to disk, eventually returning a query result to the requester. If the preventative memory usage threshold is not exceeded (N at 156), then process attempts to execute the query using the available memory and loops back to continue monitoring the memory usage (S152). If sufficient memory remains available (N at S154) and (N at 156) while monitoring and executing the query, no disk spill occurs, and the query is eventually completed using query data in memory (S160). Furthermore, if the estimate of the peak memory usage 66 estimated by the query optimizer 62 of the OLAP engine 14 or the OLTP 12 engine exceeds available system memory (Y at S170), the query executor 90 can be configured to pre-spill query data, and this pre-spill may be conducted progressively. On the other hand, if the estimate of the peak memory usage 66 does not exceed the available system memory (S170), the query executor 90 executes the query at (S150) and monitors actual memory usage (S152), as discussed above.

Figure 4A:
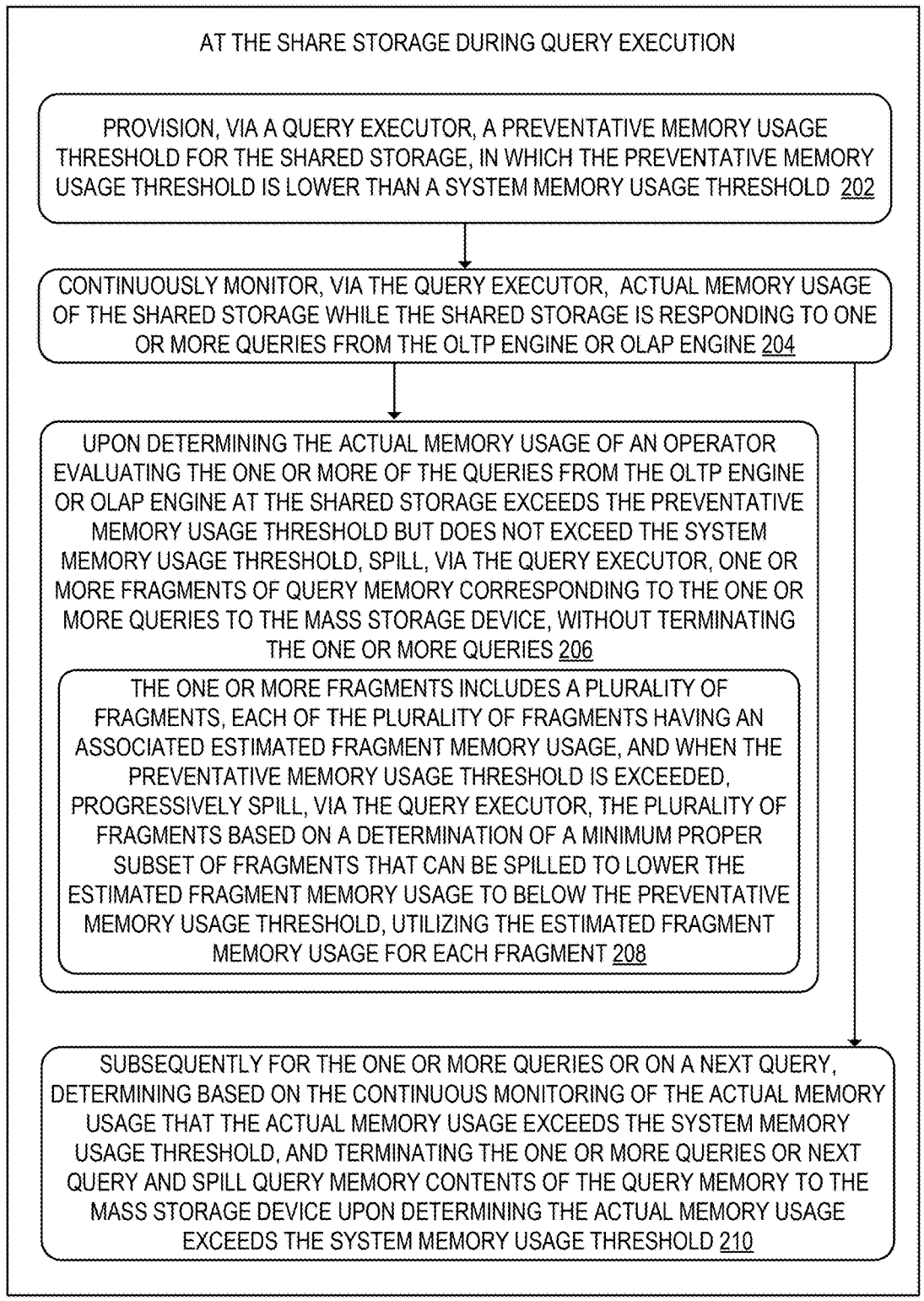
FIG. 4A shows an example flowchart of a method for disk spilling at a shared storage during query execution in an HTAP database, according to one example of the present disclosure.

FIG. 4A shows an example flowchart of a method 200 for disk spilling at a shared storage during query execution in an HTAP database, according to one example of the present disclosure. The method 200 may be implemented by the HTAP database 10 illustrated in FIG. 1, and performed at the shared storage 26. Thus, the HTAP database may include an online transaction processing (OLTP) engine, an online analytical processing (OLAP) engine provided separately from the OLTP engine, and a shared storage holding data of multiple tenants.

The following steps 202, 204, 206, 208, and 210 are performed at the shared storage during query execution. At 202, the method 200 may include provisioning, via a query executor, a preventative memory usage threshold for the shared storage, in which the preventative memory usage threshold is lower than a system memory usage threshold of the shared storage. At 204, the method 200 may include continuously monitoring, via the query executor, actual memory usage of the shared storage while the shared storage is responding to one or more queries from the OLTP engine or OLAP engine. At 206, the method 200 may include, upon determining the actual memory usage of an operator evaluating the one or more of the queries from the OLTP engine or OLAP engine at the shared storage exceeds the preventative memory usage threshold but does not exceed the system memory usage threshold, spilling, via the query executor, one or more fragments of query memory corresponding to the one or more queries to the mass storage device, without terminating the one or more queries.

At 208, the one or more fragments can include a plurality of fragments, each of the plurality of fragments can have an associated estimated fragment memory usage, and when the preventative memory usage threshold is exceeded, the method 200 may include, progressively spilling, via the query executor, the plurality of fragments based on a determination of a minimum proper subset of fragments that can be spilled to lower the estimated fragment memory usage to below the preventative memory usage threshold, utilizing the estimated fragment memory usage for each fragment.

At 210, the method 200 may include, subsequently for the one or more queries or on a next query, determining based on the continuous monitoring of the actual memory usage that the actual memory usage exceeds the system memory usage threshold, and terminating the one or more queries or next query and spill query memory contents of the query memory to the mass storage device upon determining the actual memory usage exceeds the system memory usage threshold.

Figure 4B:
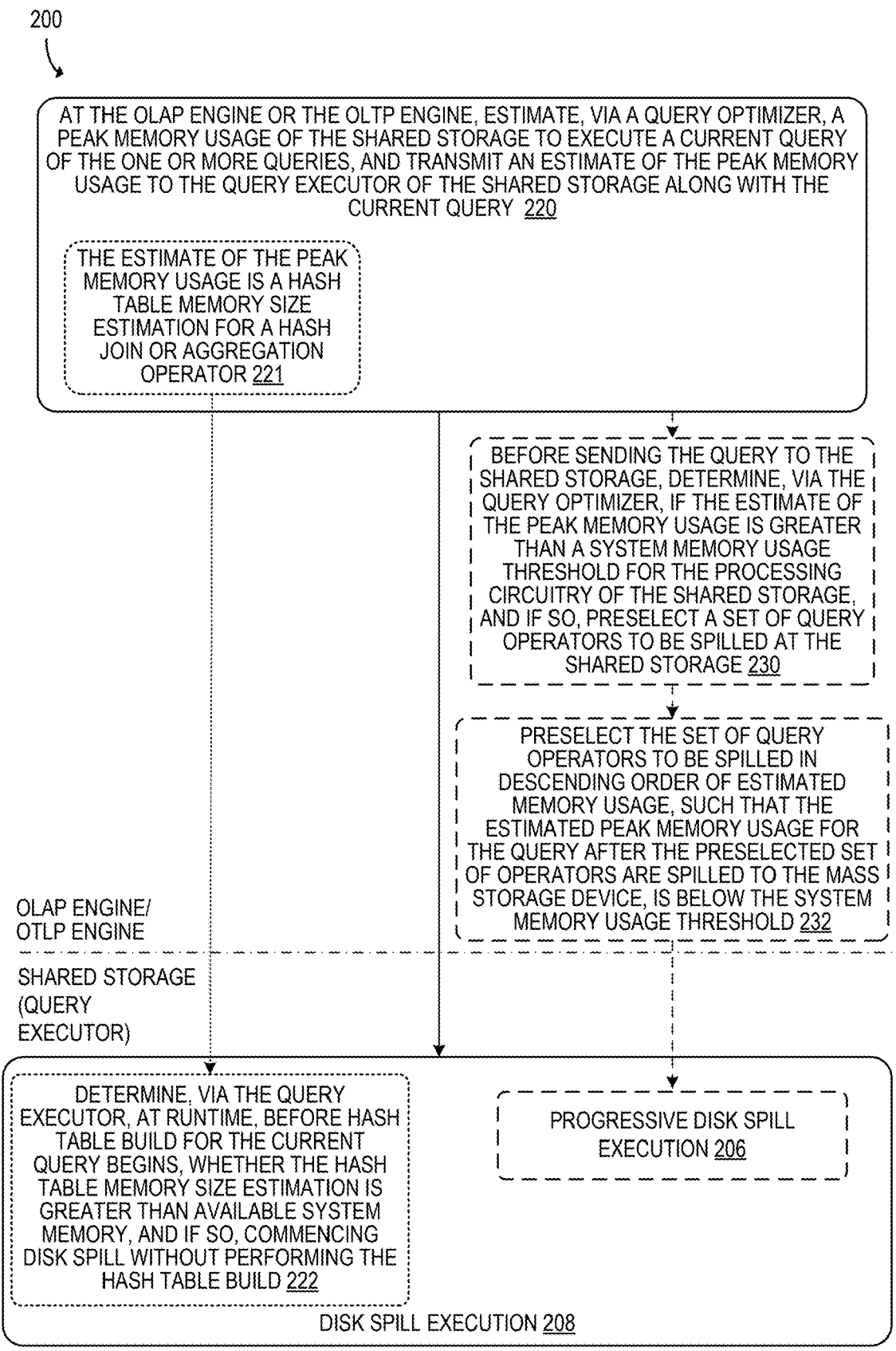
FIG. 4B shows additional steps of the method FIG. 4A, both at query planning time and execution time.

FIG. 4B shows a flowchart of additional steps of method 200 of FIG. 4A. At 220, the method 200 may include, at the OLAP engine or the OLTP engine, estimating, via a query optimizer, a peak memory usage of the shared storage to execute a current query of the one or more queries, and transmitting an estimate of the peak memory usage to the query executor of the shared storage along with the current query. As shown at 221, in some implementations the estimate of the peak memory usage can be a hash table memory size estimation for a hash join or aggregation operator. At 222, the method 200 may include determining, via the query executor, at runtime, before hash table build for the current query begins, whether the hash table memory size estimation is greater than available system memory, and if so, commencing disk spill without performing the hash table build.

Additionally or alternatively, at 230, the method 200 may include, before sending the query to the shared storage, determining, via the query optimizer, if the estimate of the peak memory usage is greater than a system memory usage threshold for the processing circuitry of the shared storage, and if so, preselecting a set of query operators to be spilled at the shared storage. At 232, the method 200 may include preselecting the set of query operators to be spilled in descending order of estimated memory usage, such that the estimated peak memory usage for the query after the preselected set of operators are spilled to the mass storage device, is below the system memory usage threshold. Following 232, the method proceeds to a progressive spill operation as described above at 206 in relation to FIG. 4A, to progressively spill the preselected set of query operators.

The systems and methods disclosed herein provide a hybrid database that is able to maintain system stability and quality of service (QOS) for shared storage. This is achieved through an adaptive disk spill mechanism that can utilize both a query optimizer and query executor to make disk spill decisions preventatively, and in some implementations progressively. By intelligently making adaptive disk spill decisions, the mechanism of the present disclosure can mitigate uncontrolled or undesirable system memory threshold-based spills, and thus minimize the overall impact on query performance due to disk spilling, while maintaining overall system stability.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
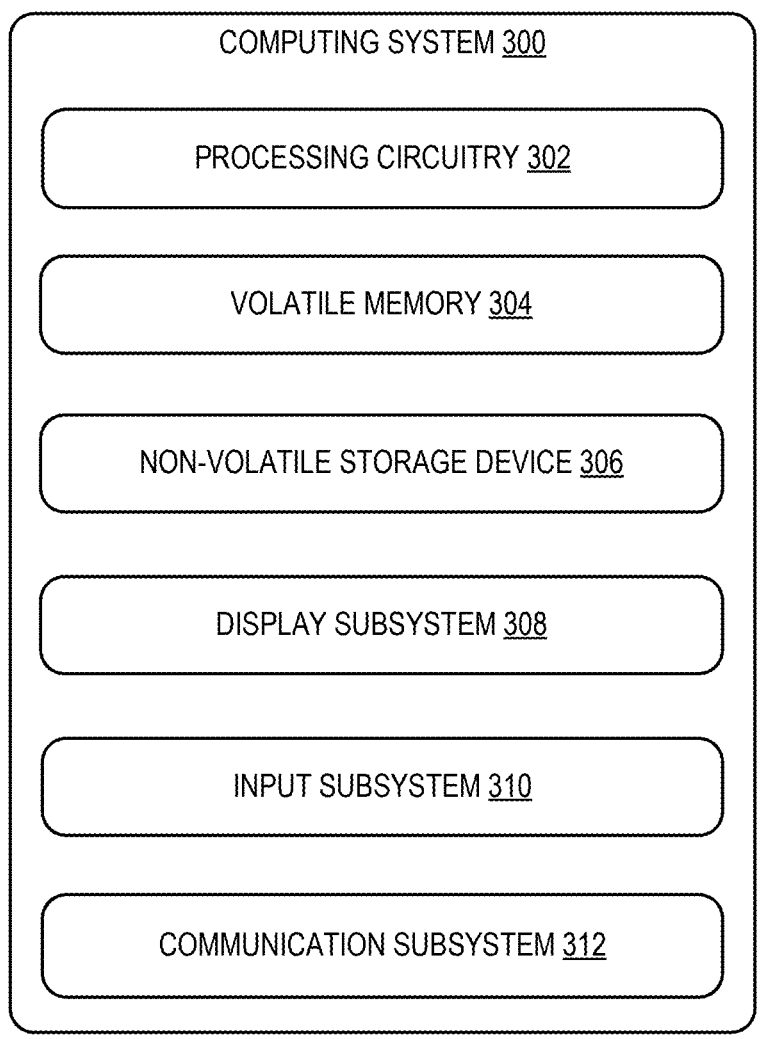
FIG. 5 shows a schematic view of an example computing environment in which the HTAP database of FIGS. 1 and 2 may be enacted.

FIG. 5 schematically shows a non-limiting embodiment of a computing system 300 that can enact one or more of the methods and processes described above. Computing system 300 is shown in simplified form. Computing system 300 may embody the HTAP database 10 described above and illustrated in FIG. 2. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 5.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs provide additional description of the subject matter of the present disclosure. One aspect provides a hybrid transactional/analytical processing (HTAP) database comprising an online transaction processing (OLTP) engine, an online analytical processing (OLAP) engine provided separately from the OLTP engine, and a shared storage holding data of multiple tenants. the shared storage includes processing circuitry and associated memory storing instructions that when executed cause the processing circuitry to implement a query executor configured to provision a preventative memory usage threshold for the shared storage, the preventative memory usage threshold being lower than a system memory usage threshold. The shared storage is further configured to continuously monitor actual memory usage of the shared storage while the shared storage is responding to one or more queries from the OLTP engine or OLAP engine. The shared storage is further configured to, upon determining the actual memory usage of an operator evaluating the one or more of the queries from the OLTP engine or OLAP engine at the shared storage exceeds the preventative memory usage threshold but does not exceed the system memory usage threshold, spill one or more fragments of query memory corresponding to the one or more queries to the mass storage device, without terminating the one or more queries.

In this aspect, the one or more fragments includes a plurality of fragments, each of the plurality of fragments having an associated estimated fragment memory usage. When the preventative memory usage threshold is exceeded, the query executor is configured to progressively spill the plurality of fragments based on a determination of a minimum proper subset of fragments that can be spilled to lower the estimated fragment memory usage to below the preventative memory usage threshold, utilizing the estimated fragment memory usage for each fragment.

In this aspect, subsequently for the one or more queries or on a next query, the processing circuitry of the shared storage is configured to determine based on the continuous monitoring of the actual memory usage that the actual memory usage exceeds the system memory usage threshold, and terminate the one or more queries or next query and spill query memory contents of the query memory to the mass storage device.

In this aspect, the OLAP engine or the OLTP engine includes a query optimizer configured to estimate a peak memory usage of the shared storage to execute a current query of the one or more queries, and transmit an estimate of the peak memory usage to the query executor of the shared storage along with the current query.

In this aspect, the estimate of the peak memory usage is a hash table memory size estimation for a hash join or aggregation operator.

In this aspect, the query executor is configured to determine at runtime, before the hash table build for the current query begins, whether hash table memory size estimation is greater than available system memory, and if so, to commence disk spill without performing the hash table build.

In this aspect, the estimate of the peak memory usage includes a degree of confidence, and the estimate of the peak memory usage is transmitted to the shared storage only after determining that the degree of confidence exceeds a minimum confidence threshold.

In this aspect, the query optimizer, is configured to, before sending the query to the shared storage, determine if the estimate of the peak memory usage is greater than a predetermined system memory limit threshold for the processing circuitry of the shared storage, and if so, preselect a set of query operators to be spilled at the shared storage.

In this aspect, the query optimizer, is configured to, before sending the query to the shared storage, determine if the estimate of the peak memory usage is greater than the system memory usage threshold for the processing circuitry of the shared storage, and if so, preselect a set of query operators to be spilled at the shared storage.

In this aspect, the set of query operators to be spilled are preselected in descending order of estimated memory usage, such that the estimated peak memory usage for the query after the preselected set of operators are spilled to the mass storage device, is below the system memory usage threshold.

Another aspect provides a data processing method for a hybrid transactional/analytical processing (HTAP) database including an online transaction processing (OLTP) engine, an online analytical processing (OLAP) engine provided separately from the OLTP engine, and a shared storage holding data of multiple tenants. The method comprises, at the shared storage, provisioning, via a query executor, a preventative memory usage threshold for the shared storage, the preventative memory usage threshold being lower than a system memory usage threshold. The method further comprises continuously monitoring, via the query executor, actual memory usage of the shared storage while the shared storage is responding to one or more queries from the OLTP engine or OLAP engine. The method further comprises, upon determining the actual memory usage of an operator evaluating the one or more of the queries from the OLTP engine or OLAP engine at the shared storage exceeds the preventative memory usage threshold but does not exceed the system memory usage threshold, spilling, via the query executor, one or more fragments of query memory corresponding to the one or more queries to the mass storage device, without terminating the one or more queries.

In this aspect, the one or more fragments includes a plurality of fragments, each of the plurality of fragments having an associated estimated fragment memory usage. When the preventative memory usage threshold is exceeded, the method further comprises progressively spilling, via the query executor, the plurality of fragments based on a determination of a minimum proper subset of fragments that can be spilled to lower the estimated fragment memory usage to below the preventative memory usage threshold, utilizing the estimated fragment memory usage for each fragment.

In this aspect, the method further comprises, subsequently for the one or more queries or on a next query, determining based on the continuous monitoring of the actual memory usage that the actual memory usage exceeds the system memory usage threshold, and terminating the one or more queries or next query and spill query memory contents of the query memory to the mass storage device upon determining the actual memory usage exceeds the system memory usage threshold.

In this aspect, the method further comprises, at the OLAP engine or the OLTP engine, estimating, via a query optimizer, a peak memory usage of the shared storage to execute a current query of the one or more queries, and transmitting an estimate of the peak memory usage to the query executor of the shared storage along with the current query.

In this aspect, the estimate of the peak memory usage is a hash table memory size estimation for a hash join or aggregation operator.

In this aspect, the method further comprise determining, via the query executor, at runtime, before hash table build for the current query begins, whether the hash table memory size estimation is greater than available system memory, and if so, commencing disk spill without performing the hash table build.

In this aspect, the estimate of the peak memory usage includes a degree of confidence, and the estimate of the peak memory usage is transmitted to the shared storage only after determining that the degree of confidence exceeds a minimum confidence threshold.

In this aspect, the method further comprises, before sending the query to the shared storage, determining, via the query optimizer, if the estimate of the peak memory usage is greater than the system memory usage threshold for the processing circuitry of the shared storage, and if so, preselecting a set of query operators to be spilled at the shared storage.

In this aspect, the set of query operators to be spilled are preselected in descending order of estimated memory usage, such that the estimated peak memory usage for the query after the preselected set of operators are spilled to the mass storage device, is below the system memory usage threshold.

Another aspect provides non-transitory computer readable storage medium storing computer-executable instructions for a hybrid transactional/analytical processing (HTAP) database including an online transaction processing (OLTP) engine, an online analytical processing (OLAP) engine provided separately from the OLTP engine, and a shared storage including a mass storage device holding data of multiple tenants. When executed by processing circuitry, the computer-executable instructions cause the processing circuitry to implement a query executor of the share storage configured to provision a preventative memory usage threshold for the shared storage, the preventative memory usage threshold being lower than a system memory usage threshold. The query executor is further configured to continuously monitor actual memory usage of the shared storage while the shared storage is responding to one or more queries from the OLTP engine or OLAP engine. The query executor is further configured to, upon determining the actual memory usage of an operator evaluating the one or more of the queries from the OLTP engine or OLAP engine at the shared storage exceeds the preventative memory usage threshold but does not exceed the system memory usage threshold, spill one or more fragments of query memory corresponding to the one or more queries to the mass storage device, without terminating the one or more queries.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hybrid transactional/analytical processing (HTAP) database, comprising:
   an online transaction processing (OLTP) engine;
   an online analytical processing (OLAP) engine provided separately from the OLTP engine; and
   a shared storage including a mass storage device holding data of multiple tenants, wherein
   the shared storage includes processing circuitry and associated memory storing instructions that when executed cause the processing circuitry to implement a query executor configured to:
     provision a preventative memory usage threshold for the shared storage, the preventative memory usage threshold being lower than a system memory usage threshold;
     continuously monitor actual memory usage of the shared storage while the shared storage is responding to one or more queries from the OLTP engine or OLAP engine;
     upon determining the actual memory usage of an operator evaluating the one or more of the queries from the OLTP engine or OLAP engine at the shared storage exceeds the preventative memory usage threshold but does not exceed the system memory usage threshold, spill one or more fragments of query memory corresponding to the one or more queries to the mass storage device, without terminating the one or more queries;
     upon determining the actual memory usage exceeds the system memory usage threshold, terminate the one or more queries or next query and spill query memory contents of the query memory to the mass storage device; and
     upon determining the actual memory usage falls below the preventative memory usage threshold, process the one or more queries without spilling the one or more queries to the mass storage device, the OLAP engine or the OLTP engine includes a query optimizer configured to estimate a peak memory usage of the shared storage to execute a current query of the one or more queries, and transmit an estimate of the peak memory usage to the query executor of the shared storage along with the current query, the estimate of the peak memory usage is a hash table memory size estimation for a hash join or aggregation operator, and the query executor is configured to determine at runtime, before a hash table build for the current query begins, whether the hash table memory size estimation is greater than available system memory, and if so, to commence disk spill without performing the hash table build.

2. The HTAP database of claim 1, wherein each of the one or more fragments has an associated estimated fragment memory usage, and when the preventative memory usage threshold is exceeded, the query executor is configured to progressively spill the one or more fragments based on a determination of a minimum proper subset of fragments that can be spilled to lower the estimated fragment memory usage to below the preventative memory usage threshold, utilizing the estimated fragment memory usage for each fragment.

3. The HTAP database of claim 1, wherein the estimate of the peak memory usage includes a degree of confidence, and the estimate of the peak memory usage is transmitted to the shared storage only after determining that the degree of confidence exceeds a minimum confidence threshold.

4. The HTAP database of claim 1, wherein the query optimizer is configured to, before sending the query to the shared storage, determine if the estimate of the peak memory usage is greater than a predetermined system memory limit threshold for the processing circuitry of the shared storage, and if so, preselect a set of query operators to be spilled at the shared storage.

5. The HTAP database of claim 1, wherein the query optimizer, is configured to, before sending the query to the shared storage, determine if the estimate of the peak memory usage is greater than the system memory usage threshold for the processing circuitry of the shared storage, and if so, preselect a set of query operators to be spilled at the shared storage.

6. The HTAP database of claim 5, wherein the set of query operators to be spilled are preselected in descending order of estimated memory usage, such that the estimated peak memory usage for the query after the preselected set of operators are spilled to the mass storage device, is below the system memory usage threshold.

7. A data processing method for a hybrid transactional/analytical processing (HTAP) database including an online transaction processing (OLTP) engine, an online analytical processing (OLAP) engine provided separately from the OLTP engine, and a shared storage including a mass storage device holding data of multiple tenants, the method comprising, at the shared storage:

provisioning, via a query executor, a preventative memory usage threshold for the shared storage, the preventative memory usage threshold being lower than a system memory usage threshold;

continuously monitoring, via the query executor, actual memory usage of the shared storage while the shared storage is responding to one or more queries from the OLTP engine or OLAP engine;

upon determining the actual memory usage of an operator evaluating the one or more of the queries from the OLTP engine or OLAP engine at the shared storage exceeds the preventative memory usage threshold but does not exceed the system memory usage threshold, spilling, via the query executor, one or more fragments of query memory corresponding to the one or more queries to the mass storage device, without terminating the one or more queries;

upon determining the actual memory usage exceeds the system memory usage threshold, terminating the one or more queries or next query and spilling query memory contents of the query memory to the mass storage device;

upon determining the actual memory usage falls below the preventative memory usage threshold, processing the one or more queries without spilling the one or more queries to the mass storage device;

at the OLAP engine or the OLTP engine, estimating, via a query optimizer, a peak memory usage of the shared storage to execute a current query of the one or more queries, and transmitting an estimate of the peak memory usage to the query executor of the shared storage along with the current query, wherein the estimate of the peak memory usage is a hash table memory size estimation for a hash join or aggregation operator; and determining, via the query executor, at runtime, before a hash table build for the current query begins, whether the hash table memory size estimation is greater than available system memory, and if so, commencing disk spill without performing the hash table build.

8. The data processing method of claim 7, wherein each of the one or more fragments has an associated estimated fragment memory usage, and when the preventative memory usage threshold is exceeded, the method further comprises progressively spilling, via the query executor, the one or more fragments based on a determination of a minimum proper subset of fragments that can be spilled to lower the estimated fragment memory usage to below the preventative memory usage threshold, utilizing the estimated fragment memory usage for each fragment.

9. The data processing method of claim 7, wherein the estimate of the peak memory usage includes a degree of confidence, and the estimate of the peak memory usage is transmitted to the shared storage only after determining that the degree of confidence exceeds a minimum confidence threshold.

10. The data processing method of claim 7, further comprising:

before sending the query to the shared storage, determining, via the query optimizer, if the estimate of the peak memory usage is greater than the system memory usage threshold for the processing circuitry of the shared storage, and if so, preselecting a set of query operators to be spilled at the shared storage.

11. The data processing method of claim 10, wherein the set of query operators to be spilled are preselected in descending order of estimated memory usage, such that the estimated peak memory usage for the query after the preselected set of operators are spilled to the mass storage device, is below the system memory usage threshold.

12. A non-transitory computer readable storage medium storing computer-executable instructions for a hybrid transactional/analytical processing (HTAP) database including an online transaction processing (OLTP) engine, an online analytical processing (OLAP) engine provided separately from the OLTP engine, and a shared storage including a mass storage device holding data of multiple tenants, wherein when executed by processing circuitry, the computer-executable instructions cause the processing circuitry to implement a query executor of the share storage configured to:

provision a preventative memory usage threshold for the shared storage, the preventative memory usage threshold being lower than a system memory usage threshold;

continuously monitor actual memory usage of the shared storage while the shared storage is responding to one or more queries from the OLTP engine or OLAP engine;

upon determining the actual memory usage of an operator evaluating the one or more of the queries from the OLTP engine or OLAP engine at the shared storage exceeds the preventative memory usage threshold but does not exceed the system memory usage threshold, spill one or more fragments of query memory corresponding to the one or more queries to the mass storage device, without terminating the one or more queries;

upon determining the actual memory usage exceeds the system memory usage threshold, terminate the one or more queries or next query and spill query memory contents of the query memory to the mass storage device; and upon determining the actual memory usage falls below the preventative memory usage threshold, process the one or more queries without spilling the one or more queries to the mass storage device, the OLAP engine or the OLTP engine includes a query optimizer configured to estimate a peak memory usage of the shared storage to execute a current query of the one or more queries, and transmit an estimate of the peak memory usage to the query executor of the shared storage along with the current query, the estimate of the peak memory usage is a hash table memory size estimation for a hash join or aggregation operator, and the query executor is configured to determine at runtime, before a hash table build for the current query begins, whether the hash table memory size estimation is greater than available system memory, and if so, to commence disk spill without performing the hash table build.

* * * * *